United States Patent

[11] 3,582,708

[72] Inventor Carl R. Snyder
 Alief, Tex.
[21] Appl. No. 801,953
[22] Filed Feb. 25, 1969
[45] Patented June 1, 1971
[73] Assignee Esquire, Inc.

[54] CONTINUOUS LIGHTING SYSTEMS FOR GASEOUS-DISCHARGE LAMPS WITH INCANDESCENT LAMPS ON STANDBY
13 Claims, 12 Drawing Figs.

[52] U.S. Cl.................................................. 315/91,
 313/92
[51] Int. Cl.......................................................H05b 39/10,
 H05b 41/46
[50] Field of Search........................................... 315/88, 91,
 92

[56] References Cited
UNITED STATES PATENTS
1,970,519 8/1934 Dorgelo et al. ............... 315/192X 2,043,023 6/1936 Westendorp................. 315/182X
FOREIGN PATENTS
377,937 5/1964 Switzerland.................. 315/92

*Primary Examiner*—Roy Lake
*Assistant Examiner*—Palmer C. Demeo
*Attorneys*—Tom Arnold, Donald C. Roylance, Walter Kruger, Bill Durkee, Frank S. Vaden, III, Louis T. Pirkey and Stanley A. Becker

ABSTRACT: An improved continuous lighting system for gaseous-discharge lamps which provides immediate lighting of incandescent light facilities upon extinguishment of the gaseous-discharge lamp. The lighting system further provides a delay, after reignition of the gaseous-discharge lamp, to maintain the incandescent lights lit until the gaseous-discharge lamp warms up and reaches a predetermined intensity, then the incandescent lights are extinguished.

Carl R. Snyder
INVENTOR

BY Arnold, Roylance,
Kruger & Durkee
ATTORNEYS

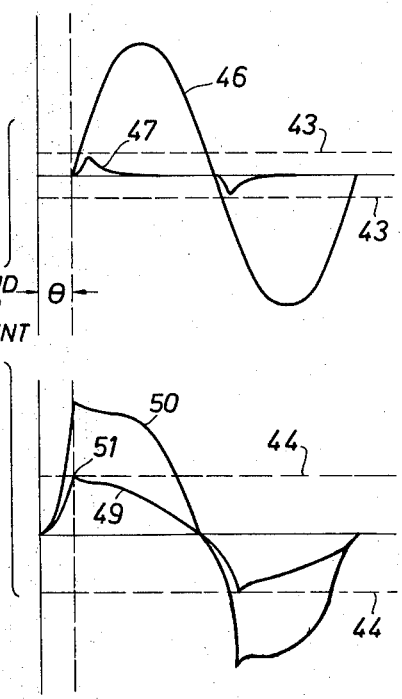
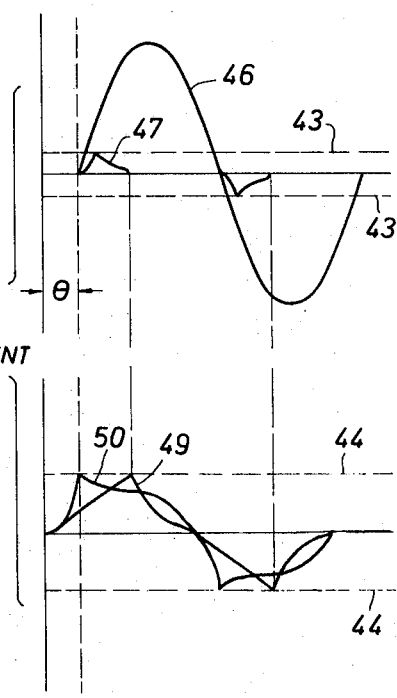
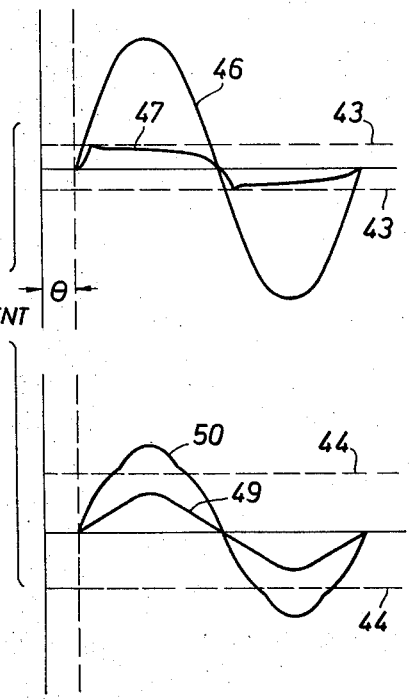
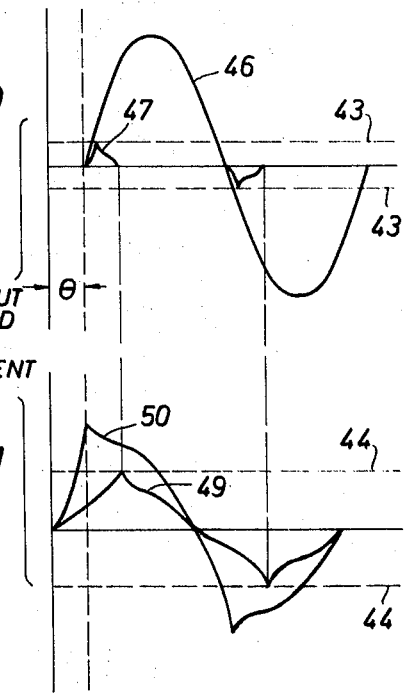

CONTINUOUS LIGHTING SYSTEMS FOR GASEOUS-DISCHARGE LAMPS WITH INCANDESCENT LAMPS ON STANDBY

BACKGROUND OF THE INVENTION

This invention relates to an improvement in continuous lighting systems for gaseous-discharge lamps of the type disclosed in U.S. Pat. No. 3,517,254 entitled "Continuous Lighting System for Gaseous-Discharge Lamps with Incandescent Lights for Standby" by Albert C. McNamara, Jr., issued June 23 1970 and assigned to the same assignee.

Gaseous-discharge lamps, such as mercury vapor and other metallic-additive vapor lamps, have long been employed in industrial lighting situations because of their extremely high efficiency when compared to other sources, such as incandescent lights. A gaseous-discharge lamp is a source of radiant energy characterized by the emission of radiation from a stream of ionized vapor carrying current between electrodes in the lamp. In starting the lamp, a relatively large voltage is required. However, once current flows in the lamp, the lamp exhibits a negative resistance characteristic. That is, the resistance of the lamp decreases with an increase in current. Because of this characteristic, some form of current limiting device is necessary to prevent the destruction of the lamp once the lamp is started. This current limiting device is called the ballast. Ballasts of complex structures using inductive and capacitive reactances have been employed in AC circuits and have increased efficiencies when compared with resistive type ballasts. Ballasts may take the form of simple chokes, transformers, autotransformers, or a combination of these or other structures.

One of the most versatile and easiest to use of all gaseous-discharge lamp ballasts is the regulator or lead type ballast. This ballast is also sometimes referred to as the constant wattage type because it provides constant wattage across the lamp, within specified fluctuations of power line voltage. This makes the lead ballast particularly advantageous over other types of reactor or lag type ballasts. In using a lead type ballast, the lamp voltage will lead the power line voltage because of the reactance in the ballast.

If a gaseous-discharge lamp is extinguished by a momentary power failure or by deliberate disconnection of the power supply, it cannot be reignited immediately. The lamp must cool down before it can be reignited. Thus, in many installations, it is desirable to have standby or emergency lighting facilities to provide continuous lighting of an area during the period when the gaseous-discharge lamp is not lit. After a gaseous-discharge lamp is reignited, it takes a period of time until the lamp fully warms up and reaches its maximum or operating brightness or intensity. During this period, it may also be desirable to maintain the emergency lighting facilities lit to provide sufficient lighting for an area until such time as the gaseous-discharge lamp provides the necessary illumination whereupon the emergency lighting facilities can be turned off.

SUMMARY OF THE INVENTION

The improved continuous lighting system utilizes the leading lamp voltage provided by the lead ballast and includes facilities which are responsive to changes in the lamp voltage and the phase angle thereof for operating incandescent light facilities to provide continuous lighting during the period when a gaseous-discharge lamp is extinguished. Additionally, the voltage and phase angle responsive facilities are such that the reignition of the gaseous-discharge lamp is sensed, but the extinguishment of the incandescent light facilities is delayed until the gaseous-discharge lamp has reached a predetermined brightness or intensity whereupon the incandescent light facilities are turned off.

Specifically, the continuous lighting system includes a lead type ballast having a gaseous-discharge lamp connected thereto. Incandescent light facilities are connected to the primary of the ballast and have a power circuit connected thereto for lighting the incandescent lights. A trigger circuit, which is responsive to the output of an integrator circuit, renders the power circuit conductive. A bypass circuit is connected to the integrator circuit and is responsive to a signal from a sensing integrator which senses the gaseous-discharge lamp voltage and the phase angle thereof. When the gaseous-discharge lamp is lit and fully warmed up, the voltage across the gaseous-discharge lamp leads the power line or source voltage and the bypass circuit conducts on each half cycle prior to the trigger circuit conducting. As long as the bypass circuit conducts first, the integrator will not be able to trigger the trigger circuit, thereby disabling the power circuit and preventing the lighting of the incandescent lights. When there is a momentary power failure, the gaseous-discharge lamp voltage drops to zero and the lamp is extinguished. With power reapplied, there is a high voltage applied to the extinguished gaseous-discharge lamp, but the lamp cannot reignite until it cools. With the gaseous-discharge lamp extinguished, the power line voltage and the lamp voltage are in phase. When these voltages are in phase, the trigger circuit takes less time to fire than the bypass circuit. At this point, the output from the integrator circuit triggers the trigger circuit, which in turn renders the power circuit conductive to light the incandescent lights to provide continuous lighting. When the gaseous-discharge lamp reignites, the voltage across the lamp is low and is leading the power line voltage. This leading low voltage is sensed by the sensing integrator, but the output signal provided is insufficient to render the bypass circuit conductive prior to the power circuit conducting in each half cycle. This provides the delaying action desired to keep the incandescent lights lit during the period that the gaseous-discharge lamp is increasing in brightness or intensity. The power circuit, once it is turned on, stays on until the end of each half cycle. Consequently, if the bypass circuit becomes conductive after the power circuit becomes conductive, the bypass circuit has no effect on the power circuit. As the gaseous-discharge lamp warms up, the leading voltage across the lamp increases in magnitude and is sensed by the sensing integrator. When the leading lamp voltage reaches a predetermined magnitude, the output from the sensing integrator renders the bypass circuit conductive at the beginning of a half cycle before the power circuit conducts, and thereby disables the power circuit turning off the incandescent lights.

BRIEF DESCRIPTION OF THE DRAWINGS

FIG. 4 is a wave diagram showing the power line voltage and the integrator output voltage when the gaseous-discharge lamp is on and fully warmed up;

FIG. 5 is a wave diagram showing the lamp voltage and the sensing integrator output voltage when the gaseous-discharge lamp is on and fully warmed up;

FIG. 6 is a wave diagram showing the power line voltage and the integrator output voltage when the gaseous-discharge lamp is extinguished;

FIG. 7 is a wave diagram showing the lamp voltage and the sensing integrator output voltage when the gaseous-discharge lamp is extinguished;

FIG. 8 is a wave diagram showing the power line voltage and the integrator output voltage when the gaseous-discharge lamp reignites;

FIG. 9 is a wave diagram showing the lamp voltage and sensing integrator output voltage when the gaseous-discharge lamp reignites;

FIG. 10 is a wave diagram showing the power line voltage and the integrator output voltage as the gaseous-discharge lamp warms up, but prior to its reaching its predetermined brightness;

FIG. 11 is a wave diagram showing the lamp voltage and the sensing integrator output voltage as the gaseous-discharge lamp warms up, but prior to its reaching its predetermined brightness;

DESCRIPTION OF THE INVENTION

Figure 1:
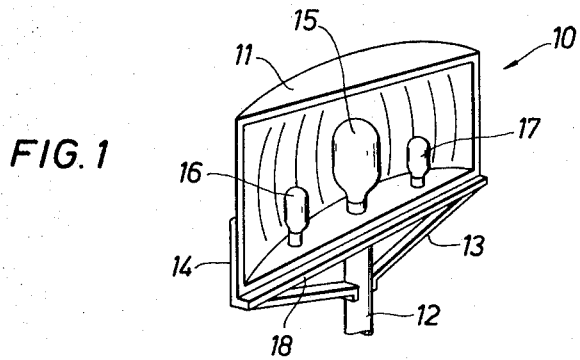
FIG. 1 is a perspective view of a typical gaseous-discharge lamp fixture incorporating an embodiment of the present invention.

Referring to FIG. 1, a gaseous-discharge lamp fixture 10 is shown, such as might be used for lighting an outdoor area, typically the entrance to a building or a parking lot. Fixture 10 includes a shield 11 secured to a support post 12 by brackets 13 and 14 in a conventional manner. Located within shield 11 is a gaseous-discharge lamp 15, typically of the mercury-vapor type, and two incandescent lights 16 and 17, which may be located at any place within the shield 11. Secured to the bottom of the shield 11 is a housing 18 in which the ballast and an electrical circuit in accordance with the invention to be described herein is located. Appropriate leads or other connections connect lamp 15 and incandescent lights 16 and 17 to the circuit within the housing 18. Appropriate power from an outside source may be brought into the housing 18 through the hollow center of post 12.

Figure 2:
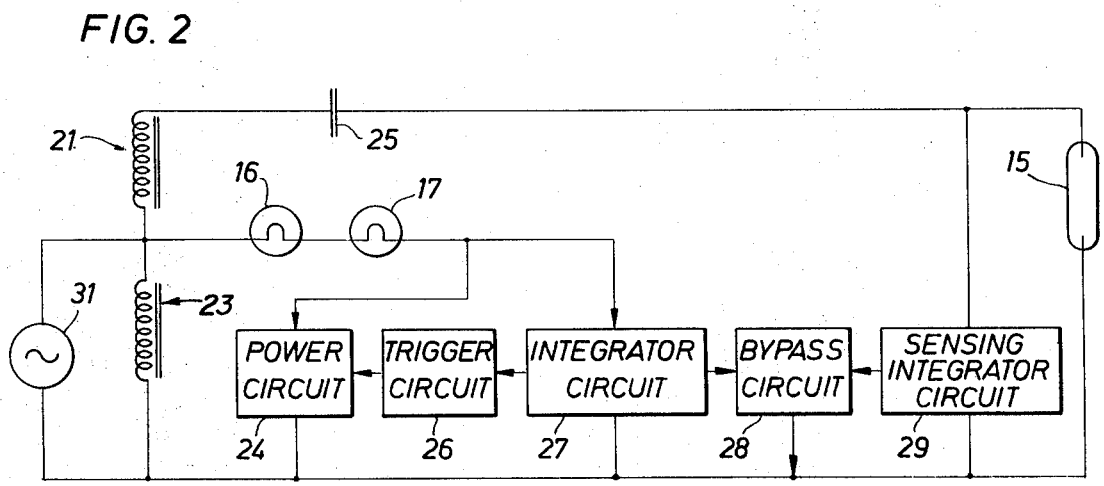
FIG. 2 is a block diagram of a continuous lighting system which embodies the principles of the present invention.

Referring to FIG. 2, there is shown a block diagram wherein the gaseous-discharge lamp 15 is connected across a lead type generally designated as 21, which may be an autotransformer 23 and capacitor 25 as shown. Incandescent lights 16 and 17 are connected to the primary of the ballast. A power circuit, generally designated as 24, is connected to the incandescent lights 16 and 17. When the power circuit 24 is conductive, voltage is applied across the incandescent lights to light the lights. A trigger circuit, generally designated as 26, is connected to the power circuit 24 and renders the power circuit 24 conductive in response to an output signal from an integrator circuit generally designated as 27. A bypass circuit, generally designated as 28 is connected to the integrator circuit 27. When the bypass circuit 28 is conductive, integrator circuit 27 is prevented from triggering the trigger circuit 26, thereby disabling power circuit 24 so that no voltage is applied to the incandescent lights 16 and 17. The bypass circuit 28 is rendered conductive in response to an output signal from a sensing integrator circuit, generally designated as 29, which senses the voltage across the gaseous-discharge lamp 15 and the phase angle thereof.

In operation, assume that the gaseous-discharge lamp 15 is lit and the incandescent lights 16 and 17 are extinguished. In this state, the sensing integrator 29 determines that the voltage across the gaseous-discharge lamp 15 is of a certain magnitude and leads the source voltage thereby rendering the bypass circuit 2 conductive. This prevents integrator circuit 27 from triggering trigger circuit 26. Consequently, the power circuit 24 is not conductive and the incandescent lights 16 and 17 are off. Upon interruption of the power, either due to a momentary power failure or to a deliberate disconnection of the power, the voltage across gaseous-discharge lamp 15 drops to zero and the gaseous-discharge lamp 15 is extinguished. With power reapplied, the voltage applied to the gaseous-discharge lamp 15 is now high, but is in phase with the power line voltage. At this point, since the trigger circuit 26 takes less time to fire than the bypass circuit 28, the output from integrator 27 triggers the trigger circuit 26, before the by pass circuit conducts, which in turn renders the power circuit 24 conductive thereby applying a voltage across the incandescent lights 17 and 17 to provide continuous lighting.

After the power is reapplied, the voltage across the lamp 15 increases to a rather high value, however, the lamp will not light until it cools. When the gaseous-discharge lamp 15 has cooled sufficiently to reignite, the voltage across the lamp 15, goes from a high voltage. This low voltage while sensed by the sensing integrator 29, is insufficient to trigger the bypass circuit 28 before the trigger circuit 26 becomes conductive. Consequently, the power circuit 24 is still conductive and voltage is applied to the incandescent lights 16 and 17. As the gaseous-discharge lamp 15 warms up, the voltage across the lamp increases. This increased leading voltage is sensed by the sensing integrator 29, and when it reaches a predetermined magnitude triggers the bypass circuit 28 before trigger circuit 26 and thereby effectively disables the power circuit 24 extinguishing the incandescent lights 16 and 17. Thus, a delay is provided so that the incandescent lights 16 and 17 remain on after the gaseous-discharge lamp 15 reignites until such time as the gaseous-discharge lamp 15 reaches a predetermined intensity. At this point, the incandescent lights 16 and 17 are no longer needed to provide sufficient lighting, and they are extinguished.

Figure 3:
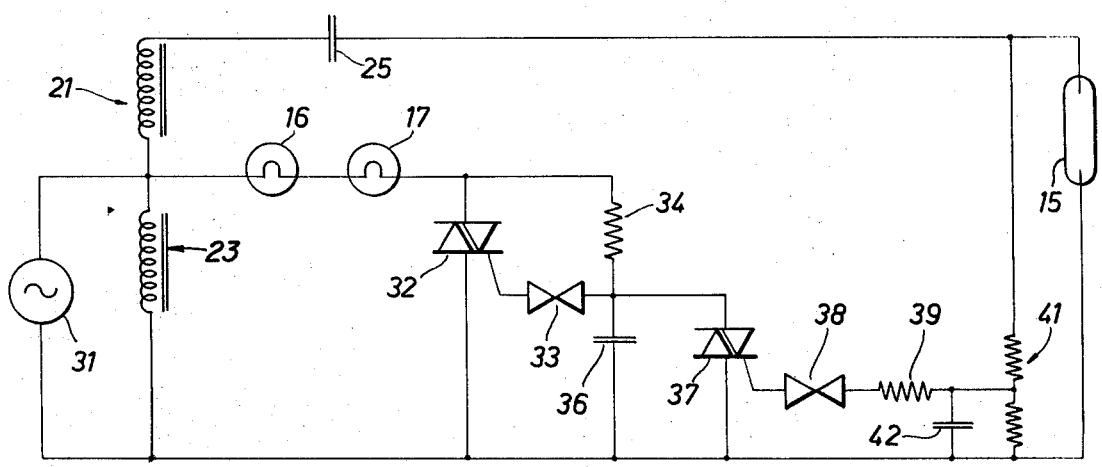
FIG. 3 is a detailed circuit diagram of the block diagram shown in FIG. 2.

Referring now to FIG. 3, there is shown a circuit diagram including an autotransformer 23 and a capacitor 25, which comprise the lead type ballast 21, connected to a voltage supply 31. Connected to the primary of the ballast 21 are the incandescent lights 16 and 17. The power circuit 24, which is connected in series with the incandescent lights 16 and 17 and the voltage source 31, includes a triac 32 having its gate electrode connected to a bilateral switch 33 which is trigger circuit 26. A bilateral switch is a device that conducts or fires when a predetermined threshold voltage is reached for either the positive or the negative half-cycles. A triac is a gated bilateral switch. While the circuit herein is described with reference to triacs and bilateral switches, it is to be understood that many modifications may be made in accordance with the principles of this invention using gated or ungated, bilateral or unilateral switches. The integrator circuit 27 includes a resistor 34 and a capacitor 36 which applies an output to the bilateral switch 33. Connected across the capacitor 36 is the bypass circuit 28 which includes a triac 37 having its gate electrode connected to another bilateral switch 38. Bilateral switch 38 is serially connected to a resistor 39. The sensing integrator 29 includes a voltage divider designated as 41 connected by a movable contact to resistor 39. A capacitor 42 is connected to the resistor 39 across a portion of the voltage divider 41.

In operation, assume again that the gaseous-discharge lamp 15 is lit and the incandescent lights 16 and 17 are extinguished. When there is a momentary interruption of the voltage source 31, gaseous-discharge lamp 15 is extinguished. Immediately prior to the extinguishment of the gaseous-discharge lamp 15, the voltage across the lamp was sufficiently high and leading the line voltage so that bilateral switch 38 was rendered conductive thereby triggering triac 37 so that the bypass circuit 28 was conductive to prevent voltage from being applied across the incandescent lights 16 and 17 through the power circuit 24. it is to be noted that when using a lead type ballast 23, such as autotransformer 23, and capacitor 25, the voltage across the gaseous-discharge lamp 15 leads the power line voltage or source voltage during the time the gaseous-discharge lamp 15 is on, because of the reactive values of the ballast 21 and capacitor 25. Further, it is noted that with this same ballast, with the discharge lamp extinguished the voltage applied to it is in phase with the power line voltage. The values of the resistor 34 and the voltage divider 41 and the capacitors 36 and 42 are chosen such that, when the gaseous-discharge lamp 15 is on and fully warmed up it takes less time to reach the threshold voltage of switch 38 than it takes to reach the threshold voltage of switch 33 so that bypass occurs. Conversely, when the gaseous-discharge lamp 15 is extinguished (in the cooling state) it takes more time to reach the threshold voltage of switch 38 than it takes to reach the threshold voltage of switch 33, therefore, there is no bypass and the power circuit is conductive.

After the voltage source 31 is turned on again, the gaseous-discharge lamp 15 remaining extinguished until it cools sufficiently, voltage is applied across resistor 34 and to capacitor 36 and when the charge on the capacitor 36 builds up sufficiently, which takes place early in each half cycle, it reaches the threshold level of bilateral switch 33 rendering the switch 33 conductive and thereby triggering the triac 32 which connects the voltage source 31 across the incandescent lights 16 and 17 to immediately light those lights. During the time that the gaseoustdischarge lamp 15 is cooling the incandescent lights 16 and 17 remain lit. The nature of a triac is such that once it is triggered it stays conductive until it turns itself off at the end of each half cycle. Thus with a 60 Hz. supply, incandescent lamps 17 and 17 turn on 120 times per second, or each half cycle. When the gaseous-discharge lamp 15 has cooled sufficiently so that it reignites there is a leading low voltage developed across the lamp. This leading low voltage insufficient to render the bilateral switch 38 conductive. Thus the triac 37 remains nonconductive thereby permitting the triac 32 to continue to be triggered each half cycle to apply a voltage across the incandescent lights 16 and 17.

As the gaseous-discharge lamp 15 warms up, the leading voltage across the lamp 15 increases until the output of the sensing integrator 29 reaches the threshold value of bilateral switch 38 prior to the output from integrator 27 reaching the threshold value of bilateral switch 33. When switch 38 is triggered before switch 33, it triggers triac 37 which renders the bypass circuit conductive. Bearing in mind the nature of a triac and that the lamp voltage leads the power line voltage, once triac 37 is triggered before triac 32, the bypass circuit is conductive each half cycle and prevents the power circuit from applying a voltage across the incandescent lights 16 and 17. This operation is described more fully when considered in conjunction with the descriptions of FIG. 4 through 11. As long as the gaseous-discharge lamp 15 is lit after warming up, the triac 37 is conductive each half cycle thereby disabling the power circuit and leaving the incandescent lights 16 and 17 extinguished.

Referring now to FIGS. 4 through 11, there are shown wave diagrams for various operating conditions of the gaseous-discharge lamp illustrating the operation of the system. The dotted lines 43 indicate the threshold voltage necessary to fire the bilateral switch 33, and the dotted lines 44 indicate the threshold voltage necessary to fire the bilateral switch 38. The AC power line voltage as it varies with time is indicated by line 46. The AC lamp voltage, or the voltage applied to the gaseous-discharge lamp 15, as it varies with time is indicated by line 50. Note that the lamp voltage 50 leads the power line voltage 46 when the gaseous-discharge lamp 15 is lit because of the lead type ballast 21. The output voltage from integrator 27 as it varies with time is indicated by line 47, and the output voltage from the sensing integrator 29 as it varies with time is indicated by line 49.

In FIGS. 4 and 5, the gaseous-dishcarge lamp 15 is lit, and the incandescent lights 16 and 17 are extinguished. As long as the gaseous-discharge lamp 15 is lit, the lamp voltage 50 leads the power line voltage 46 by angle theta, and the output voltage 49 from the sensing integrator 29 is sufficient to fire the bilateral switch 38, as shown at trigger point 51, which in turn triggers triac 37 to conduct, rendering the bypass circuit 28 conductive. The bypass circuit 28 drains current from the integrator 27 preventing the capacitor 36 from charging sufficiently to fire switch 33. FIG. 4 illustrates that the output voltage 47 from integrator 27 is below the threshold voltage 43. Consequently, switch does not fire triac 32 is not triggered and thus the power circuit 24 is nonconductive leaving the incandescent lights 16 and 17 off.

FIGS. 6 and 7, the power has been momentarily turned off extinguishing the gaseous-discharge lamp 15. It is to be noted here that the lamp voltage 50 is now in phase with the power line voltage 46. The gaseous-discharge lamp 15 has not been reignited at this point. Immediately upon extinguishment of gaseous-discharge lamp 15, since integrator 27 has a faster charge up time than integrator 29, the voltage 47 reaches threshold voltage 43 and the bilateral switch 33 is triggered thereby applying a gating voltage to triac 32 to make power circuit 24 conductive and light the incandescent lights 16 and 17. The output voltage 49 from integrator 29 is insufficient to reach the threshold 44, as shown in FIG. 7, hence the bypass circuit 28 is not conductive.

FIGS. 8 and 9 illustrate the condition where the gaseous-discharge lamp has reignited, but has not warmed up to its predetermined brightness. Note that immediately upon ignition, the lamp voltage 50 leads the power line voltage 46 by angle theta. However, the lamp voltage 50 is just building up, and since integrator 27 charges up faster than integrator 29, voltage 47 reaches threshold 43 before voltage 49 reaches threshold 44. Thus, the incandescent lights 16 and 17 remain lit after the gaseous-discharge lamp 15 has reignited. It is understood, of course, that once triac 32 is conducting, it remains conductive until the end of the half cycle. Therefore, as long as voltage 47 reaches its threshold 43 before voltage 49 reaches its threshold 44, the incandescent lights stay lit. This provides the delaying action of the system. Different component having different threshold values can be selected to give any desired delay. Most advantageously, however, a delay will be chosen which is sufficient for the gaseous-discharge lamp to substantially reach its operating or maximum brightness or intensity, while not exceeding the primary operating current.

FIGS. 10 and 11 show the condition where the gaseous-discharge lamp 15 has warmed up even further, although still not to its predetermined brightness. It can readily be seen that since the lamp voltage 50 leads the power line voltage 46, and is substantially a square wave, the voltage 49 will soon reach its threshold 44 before voltage 47 reaches its threshold 43. When this occurs, the bypass circuit 24 becomes conductive and the incandescent lights 16 and 17 are extinguished as described with reference to FIGS. 4 and 5.

Figure 12:
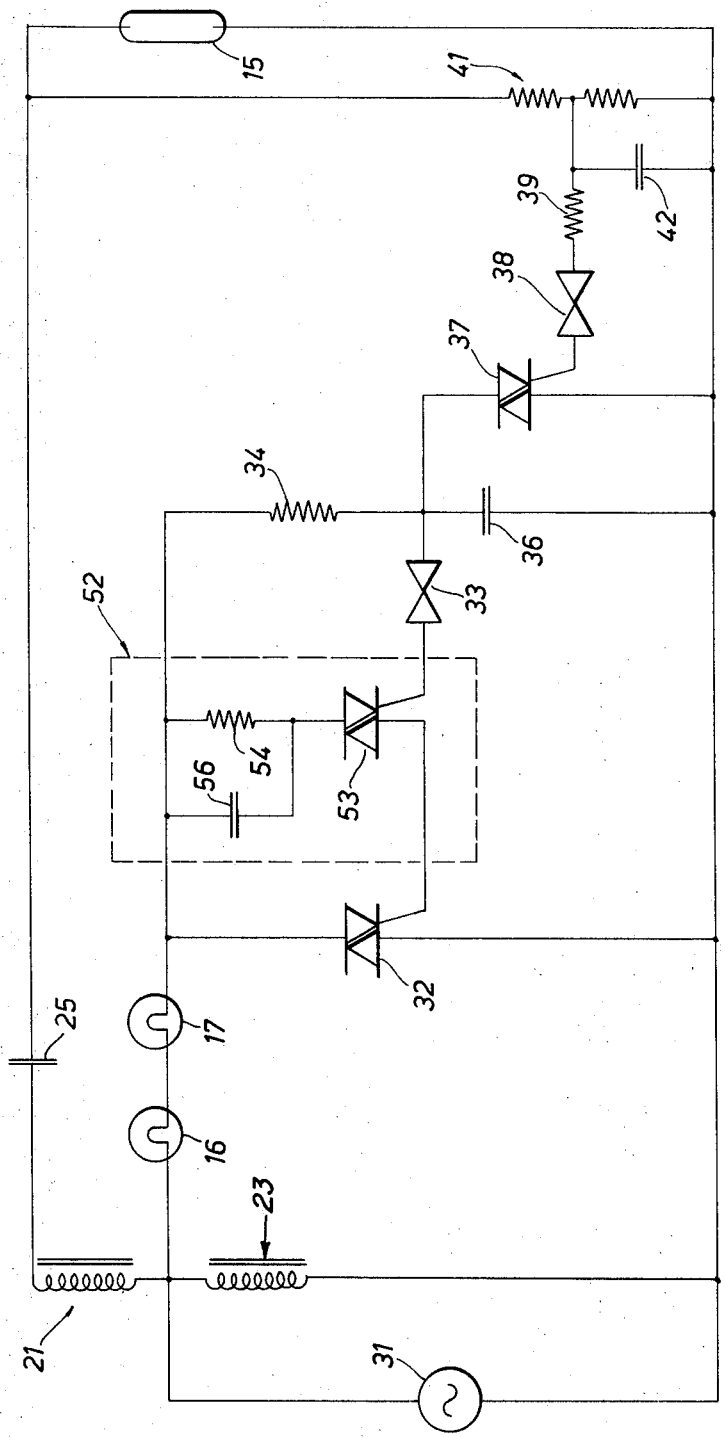
FIG. 12 is an alternative embodiment of the circuit shown in FIG. 3 which includes a power circuit gate signal amplifier.

FIG. 12 shows an alternative embodiment of the circuit shown in FIG. 3 which includes a gate signal amplifier 52 connected between the power circuit 24 and the trigger circuit 26. The gate signal amplifier includes a triac 53 having one terminal connected to the power circuit triac 32 and the other terminal connected to a parallel combination of a resistor 54 and a capacitor 56. The gate of triac 53 is connected to the bilateral switch 33. This added amplifier circuit 52 reduces the gating power loss and provides a high gating current to the power circuit triac 32.

It is to be understood that the above described embodiments are merely illustrative of an application of the principles of this invention and that numerous other arrangements and modifications may be made within the spirit and scope of the invention.

What I claim is:

1. A continuous lighting system comprising:
a gaseous-discharge lamp;
lead ballast means connected to said gaseous-discharge lamp;
an AC voltage source connected to said ballast means to ignite and operate said gaseous-discharge lamp;
incandescent light means; and
control means responsive to the extinguishment of said gaseous-discharge lamp for lighting said incandescent light means, said control means further responsive to the magnitude of the voltage across the gaseous-discharge lamp and the phase difference between said lamp voltage and said AC source voltage for extinguishing said incandescent light means after the gaseous-discharge lamp reignites and reaches a predetermined intensity.

2. A continuous lighting system comprising:
a gaseous-discharge lamp;
lead ballast means connected to said gaseous-discharge lamp;
an AC voltage source connected to said ballast means to ignite and operate said gaseous-discharge lamp;
incandescent light means;
first switch means responsive to a first predetermined voltage for lighting said incandescent light means;
first integrator circuit means having an input connected to said voltage source and an output connected to said first switch means;
second integrator circuit means having an input connected to said gaseous discharge lamp and an output; and second switch means responsive to the output of said second integrator circuit means having a second predetermined voltage and phase angle for preventing said output from said first integrator circuit from reaching said first predetermined voltage.

3. A continuous lighting system comprising:
a gaseous-discharge lamp;
lead ballast means connected to said gaseous-discharge lamp;
an AC voltage source connected to said ballast means to ignite and operate said gaseous-discharge lamp;
incandescent light means;
first circuit means responsive to the source voltage and the voltage across the gaseous-discharge lamp being in phase for lighting said incandescent light means; and
second circuit means responsive to the voltage across the gaseous-discharge lamp reaching a predetermined magnitude and leading the source voltage for disabling said first circuit means to extinguish said incandescent light means.

4. A continuous lighting system as described in claim 3 wherein said first circuit means includes:
first gated switch means connected in series with said incandescent light means and said voltage source;
first integrator circuit means having an input connected to said voltage source and an output, and
second switch means responsive to a predetermined output from said first integrator circuit means for applying a gating voltage to said first gated switch means to light said incandescent light means.

5. A continuous lighting system as described in claim 4 including:
means for amplifying the gating voltage applied to said first gated switch means.

6. A continuous lighting system as described in claim 3 wherein said second circuit means includes:
second integrator means having am input connected to said gaseous-discharge lamp and an output; and
bypass circuit means responsive to an output from said second integrator means of a predetermined magnitude and phase angle for disabling said first circuit means.

7. A continuous lighting system as described in claim 1 wherein said control means includes:
first gated bilateral switch means connected in series with said incandescent light means and said voltage source;
a first resistance and a first capacitance forming a first series combination, said first series combination connected in parallel across said first gated bilateral switch means;
second bilateral switch means connecting the gate electrode of said first gated bilateral switch means with the juncture of said first resistance and said first capacitance;
a voltage divider means connected across said gaseous-discharge lamp;
third gated bilateral switch means connected across said first capacitance;
fourth bilateral switch means connected to the gate electrode of said third gated bilateral switch means;
a second resistance and a second capacitance connected in series with said fourth bilateral switch means; and
means for connecting the juncture of said second resistance and said second capacitance to a preselected point on said voltage divider means.

8. A continuous lighting system comprising:
a gaseous-discharge lamp;
lead ballast means connected to said gaseous-discharge lamp;
power means for applying an AC voltage to said ballast means to ignite and operate said gaseous-discharge lamp;
incandescent light means;
first circuit means responsive to a first voltage for applying voltage from said power means to said incandescent light means;
second circuit means, connected to said gaseous-discharge lamp and said first circuit means, responsive to a second voltage greater than and leading said first voltage for disabling said first circuit means to extinguish said incandescent light means, said second leading voltage being applied when said gaseous-discharge lamp is lit and has reached a predetermined intensity.

9. A continuous lighting system as described in claim 8 wherein said first circuit means includes:
first gated bilateral switch means connected in series with said incandescent light means and said power means;
first integrator circuit means having an input connected to said power means and an output; and
second bilateral switch means connecting the gate electrode of said first gated bilateral switch means with the output of said first integrator circuit means.

10. A continuous lighting system as described in claim 8 wherein said second circuit means includes:
second integrator circuit means having an input connected to said gaseous-discharge lamp and an output; and
bypass circuit means responsive to an output from said second integrator means of a predetermined magnitude and phase angle for disabling said first circuit means.

11. A continuous lighting system as described in claim 10 wherein said bypass circuit means includes:
third gated bilateral switch means connected to disable said first integrator circuit means when conductive; and
fourth bilateral switch means responsive to the output of said second integrator circuit means for applying a gate voltage to said third gated bilateral switch means.

12. A continuous lighting system comprising:
a gaseous-discharge lamp;
lead ballast means connected to said gaseous-discharge lamp;
power means for applying an AC voltage to said ballast means to ignite and operate said gaseous-discharge lamp;
incandescent light means;
first circuit means, connected to said incandescent light means, responsive to a first trigger voltage for applying voltage from said power means to said incandescent light means;
second circuit means, connected to said gaseous-discharge lamp and said first circuit means, said second circuit means normally being conductive and providing a voltage bypass from said first circuit means when said gaseous-discharge lamp is operating at a predetermined intensity preventing said first trigger voltage from being applied to said first circuit means, said second circuit means being nonconductive in response to the extinguishment of said gaseous-discharge lamp to permit said first trigger voltage to be applied to said first circuit means to light said incandescent light means, said incandescent light means remaining lit until said second circuit means conducts in response to the gaseous-discharge lamp reigniting and reaching a predetermined intensity.

13. A continuous lighting system comprising
a gaseous-discharge lamp;
lead ballast means connected to said gaseous-discharge lamp;
an AC voltage source;
incandescent light means;
a power circuit connected in series with said incandescent light means and said voltage source, said power circuit rendered conductive in response to a gating voltage;
a trigger circuit for applying said gating voltage to said power circuit in response to a predetermined threshold voltage;
an integrator circuit having an input connected to said voltage source and an output connected to said trigger circuit;
a sensing circuit having an input connected to said gaseous-discharge lamp and an output; and
a bypass circuit connected to the output of said sensing circuit; said by pass circuit conducting when said gaseous discharge lamp is lit and operating at a predetermined intensity to prevent said integrator circuit bypass applying the predetermined threshold voltage to said trigger circuit; said bypass circuit being nonconductive in response to the output of said sensing circuit indicating that the gaseous-discharge lamp is extinguished to permit said integrator circuit to apply the predetermined threshold voltage to said trigger circuit to enable said power circuit to light said incandescent light means.

PO-1050
(5/69)

UNITED STATES PATENT OFFICE
CERTIFICATE OF CORRECTION

Patent No. 3,582,708                    Dated June 1, 1971

Inventor(s)   Carl R. Snyder

It is certified that error appears in the above-identified patent and that said Letters Patent are hereby corrected as shown below:

Column 3, line 26, after "type" should be inserted --ballast--; line 52, "2" should read --28--;
line 66, "17" should read --16--; line 72, after "high voltage" should be inserted --value to a low voltage value and leads the line voltage.--; Column 4, line 49, "it" should read --It--;
Column 5, line 2, "gaseoustdischarge" should read --gaseous-discharge--; line 6, after lamps, "17" should read --16--; line 10, before "insufficient" should be inserted --is--; line 59, before "switch" should be inserted --33--; line 63, before "FIGS." should be inserted --In--; Column 6, line 15, "component" should read --components--.
Column 9, line 1, "bypass" should read --from--.

Signed and sealed this 22nd day of February 1972.

(SEAL)
Attest:

EDWARD M. FLETCHER, JR.          ROBERT GOTTSCHALK
Attesting Officer                Commissioner of Patents